Patented Apr. 22, 1930

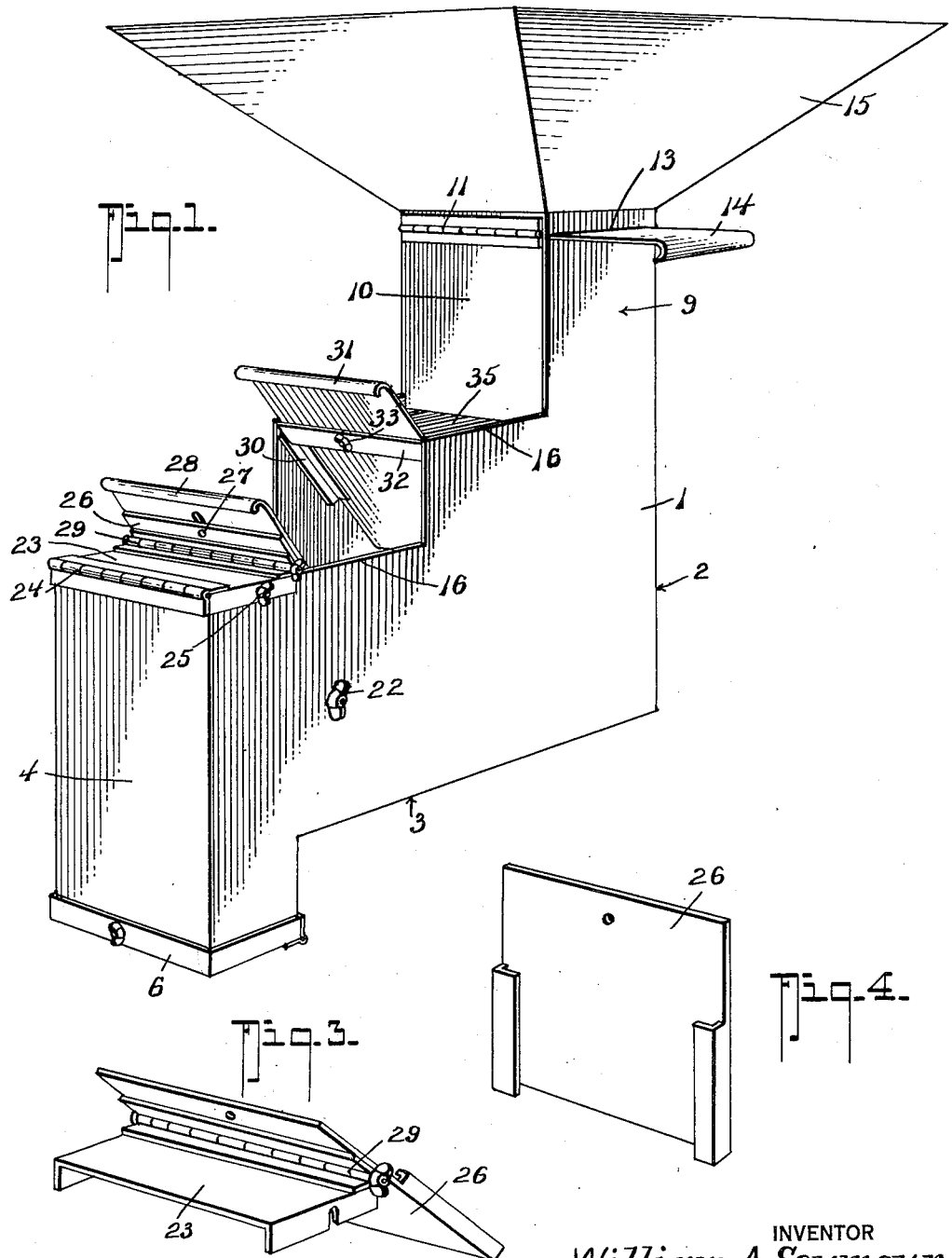

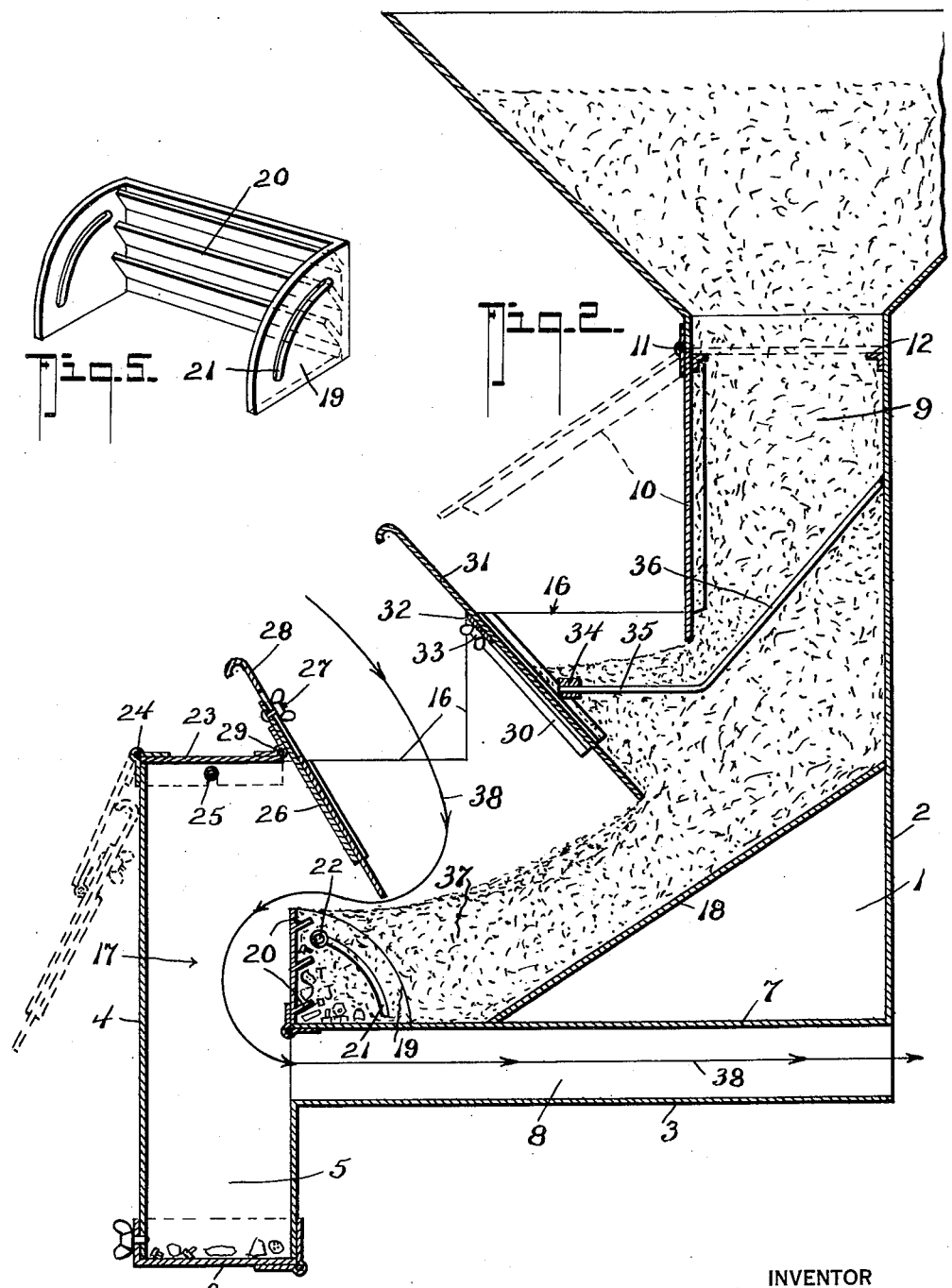

1,755,490

UNITED STATES PATENT OFFICE

WILLIAM ALEXANDER SEYMOUR, OF LEAVENWORTH, KANSAS, ASSIGNOR TO THE HESSE MANUFACTURING COMPANY, INCORPORATED, OF LEAVENWORTH, KANSAS

AUTOMATIC FEEDER FOR MILLS

Application filed July 16, 1928. Serial No. 293,011.

The invention relates to means for feeding material to mills of that type in which a current of air passes through the mill, and the invention has for its object to provide a simple, inexpensive, easily adjusted, reliable feeder for delivering grain and other comminuted substances to grain mills and other mills which employ a suction system, (either by means of fans or the individual mills or by using one large fan and duct for a bank of mills).

Further it is an object to provide an automatic feeder with separately adjustable weight and feed controls.

Again it is an object to provide a feeder with dual means for separating out the heavy foreign matter from the grain.

Another object is to provide an automatic feeder so constructed that when once set for a given material it will remain so, so long as the mill is working on the particular material for which the feeder has been set, and this regardless of whether the mill is temporarily shut down or not.

A fourth object is to provide a feeder with means in virtue of which it can readily be cleaned out when necessary or desirable. And further, it is an object to provide a feeder which delivers its substance to the mill in proportion to the velocity of air drawn into or passed through the mill, (when the velocity of air increases a proportionate increase in the volume of grain fed is obtained and vice versa).

Other objects will in part be obvious and in part be pointed out hereinafter.

To the attainment of the aforesaid objects and ends, my invention consists in the novel details of construction and in the combination, connection and arrangement of parts hereinafter more fully described and then pointed out in the claims.

In the accompanying drawings showing an illustrative embodiment of the invention, Figure 1 is a perspective view of my new feeder.

Figure 2 is a longitudinal section of the feeder.

Figure 3 is a detail perspective view of the cover 23 and the adjustable base for the feed control slide.

Figure 4 is a detail perspective view of the adjustable base looking from the front.

Figure 5 is a detail perspective view of the level control element with its flight.

In the drawings in which like numerals and letters of reference indicate like parts in all the figures, 1 represents the side walls of the feeder, the upper edges of which are stepped as at 16 for a purpose presently made clear. The feeder also comprises a back wall 2, a bottom 3 and a front wall 4.

Depending from the bottom 3 at the front of the feeder is a collection pocket 5 having a clean out door 6 at the bottom thereof. The pocket 5 is located directly beneath the downward passage way 17 through which the air stream (indicated by arrow 38) and the comminuted material passes from the feeding chamber 37 to the outlet passage 8, the latter opening through the wall 2 and being connected with the suction inlets (not shown) of the mills (not shown). The duct 8 is formed between the bottom 3 and a horizontal partition 7 above the bottom 3.

The fore part of the partition 7 constitutes a part of the bottom of the feeding chamber, the remainder of which bottom is present in the ramp 18.

The feeder also includes the inlet throat 9 into which the receiving hopper 15 discharges, the discharge being controlled by a shut off valve 14 which enters through a slot 13 in a wall 1 and rides on guides 12.

The front wall 10 of the throat 9 is separable from the remaining walls and is hinged at 11 so that it may be lifted for clean out purposes, when desired (see dotted lines in Figure 2). At the front of the feeding chamber there is hinged to the front edge of the partition 7, a level control element which comprises side wings 19 and a front flight 20, one wing at least being slotted as at 21 to cooperate with the winged bolt and nut securing device 22, which holds the level control element in its adjusting positions.

A cover 23 is hinged at 24 to the upper edge of the front wall 4 and overlies the passage 17. It is secured by a thumbscrew 25 as shown.

An adjustable gate 26 is hinged to the front edge of the cover 23 in which is mounted the feed control slide 28, the latter being held to the gate by a thumbscrew 27.

The hinge 29 is provided with means for imparting retaining function to the joint so as to hold the gate 26 at any angle to which it may be set.

About midway between the throat 9 and entrance to the passage 17 is the weight control slide 31 which is mounted in angle guides 30 located at about 45 degrees to the horizontal.

A cross bar 32 connects the sides 1—1 and carries a thumbscrew 33 to hold the slide 31 in its adjusted positions.

Located adjacent the upper face of the slide 31 and a suitable distance below the upper step 16 of the sides 1 is a cross bar support 34 for the screen bars. These bars are composed of horizontal portions 35 and upwardly and rearwardly inclined portions 36, the latter projecting upwardly into the throat 9.

Operation

Refer more especially to Figure 2.

In starting to use the feeder, the cover 23 is thrown back as shown in dotted lines so top of feeding chamber is fully open.

The shut off valve 14 is now fully opened to permit the grain to gravitate through the screen bars 35.

The weight control valve 31 is then adjusted until the grain stands about 2 inches deep in the fore part of the feeding chamber adjacent the flights 20 and the valve 31 is secured at this point by the thumbscrew 33 so it will not change its position under the influence of the vibration of the mill.

Then the gate 26 and cover 23 are replaced and the cover locked by thumbscrew 25.

The mill is now started up and thereby sets up the air current 38 and the gate 26 is adjusted to the proper angle so that the air passes over the grain cavity or feeding chamber 37 without drawing any grain into the mill.

After adjusting the angle of the gate 26 the slide valve 28 is shoved down until it brings the air current close enough to draw the grain into the mill. The valve 28 is then locked by the thumbscrew 27 and the feeder will function so long as any grain remains in the feeder.

When the gate 26 and the slide 28 are once adjusted to the proper angle and depth, the mill may be shut down and started up at will, with no attention being given to the feed, as the feed of grain depends only on the current of air. When the velocity of air decreases, the feed decreases proportionately.

When a heavier load of feed on the mills is desired, the valve 28 is shoved farther in closer to the grain. This decreases the area of the air pass and thus causes an increase in the velocity of the air passing through and proportionately carries over more grain.

It will be seen that by providing the front dam or level control with the flights 20 heavy foreign material such as nails, screws, rocks, glass and other detritus, is trapped at the front part of the feeding chamber. Should the accumulation become more than can there be accommodated the excess will pass over the dam and gravitate into the pocket 5.

By constructing the dam or level control as shown and described it may be dropped forward into passage 17 in order to clean out the foreign matter, which then falls into pocket 5 from which it can be removed by dropping the door 6.

With a feeder embodying my invention, the flow of material into the mill is under direct control of the current of air generated by the fan on the mill (or any air system employed to create a draft through the mill), and when properly set, only as much grain is drawn into the mill as equals the finished material passing out of the grinding chamber.

I have found, by experiment, that a feeder constructed in accordance with my invention can be run continuously for seven days and nights without a shut down for cleaning out the foreign matter. This is due to the presence of the dual trapping system employed in my feeder.

The reason for having the gate 26 hinged and having slide 28 adjustable is as follows:—

In feeding a comparatively heavy commodity such as shelled corn the operating positions would be about the same as shown in the drawing Figure 2. Slide 31 would be pushed down comparatively close to the ramp 18 because shelled corn is heavy enough and has enough weight itself to keep the proper level in the feed chamber as the material is taken away into the mill. Likewise the angle at which the gate 26 and slide 28 is set makes a comparatively close aperture through which the air current must go, thereby increasing the velocity sufficiently to pick up the heavy grains of corn.

However, in feeding a light commodity such as bran for instance, the slide 31 must be pulled all the way up so as to permit a sufficient volume of bran to act to give the required weight to keep the desired level in the feeding chamber as the material is being withdrawn by the air stream. Slide valve 26 would have to be raised so that the current of air will pass through a pass of great area and consequently have lesser velocity because of the lighter weight materials operated on.

While my invention has been especially described as useful in connection with grain mills it is obvious that it may be used with mills for grinding other granular or comminuted substances, so long as such mills employ air currents to convey materials into the mill.

From the foregoing description, taken in connection with the accompanying drawings, it is thought that the novel details of construction, the manner of use and the advantages of the invention will be readily apparent to those skilled in the art to which it relates.

What I claim is:

1. An automatic feeder comprising a casing having an entrance throat, a feeding chamber to one side of said entrance throat, and a discharge passage; means within the chamber for maintaining a definite level of material therein, said level-maintaining means including a level-defining means and means for preventing overflow of material to said defining means, and means for directing an air current through the feeding chamber over the material therein thereby to convey material from the feeding chamber through the discharge passage.

2. An automatic feeder comprising a casing having an entrance throat, a feeding chamber to one side of said entrance throat, and a discharge passage; means within the chamber for maintaining a definite level of material therein, said level-maintaining means including a level-defining means and means for preventing overflow of material to said defining means; means for directing an air current through the feeding chamber over the material therein thereby to convey material from the feeding chamber through the discharge passage; and means to adjust the position of said directing means to vary the velocity of the air passing in contact with the material in the feeding chamber.

3. An automatic feeder comprising a casing having an entrance throat, a feeding chamber to one side of said entrance throat, and a discharge passage; means within the chamber for maintaining a definite level of material therein, said level-maintaining means including a level-defining means and means for preventing overflow of material to said defining means; and means for directing an air current through the feeding chamber over the material therein thereby to convey material from the feeding chamber through the discharge passage; said level maintaining means including a weight-control slide located between the feeding chamber and the entrance throat.

4. An automatic feeder comprising a casing having an entrance throat, a feeding chamber and a discharge passage; means within the chamber for maintaining a definite level of material therein, said level-maintaining means including a level-defining means and means for preventing overflow of material to said defining means; means for directing an air current through the feeding chamber over the material therein thereby to convey material from the feeding chamber through the discharge passage; means to adjust the position of said directing means to vary the velocity of the air passing in contact with the material in the feeding chamber; the said level maintaining means including a weight-control slide located between the feeding chamber and the entrance throat.

5. An automatic feeder comprising a casing having an entrance throat, a feeding chamber and a discharge passage; means within the chamber for maintaining a definite level of material therein; means for directing an air current through the feeding chamber over the material therein thereby to convey material from the feeding chamber through the discharge passage; said level maintaining means including a weight-control slide located between the feeding chamber and the entrance throat and a level-defining device at the exit end of the feeding chamber.

6. An automatic feeder comprising a casing having an entrance throat, a feeding chamber and a discharge passage; means within the chamber for maintaining a definite level of material therein; means for directing an air current through the feeding chamber over the material therein thereby to convey material from the feeding chamber through the discharge passage; said level maintaining means including a weight-control slide located between the feeding chamber and the entrance throat; and a level-control device at the exit end of the feeding chamber, said level-control device comprising a wall with flights.

7. An automatic feeder comprising a casing having an entrance throat, a feeding chamber and a discharge passage; means within the chamber for maintaining a definite level of material therein; means for directing an air current through the feeding chamber over the material therein thereby to convey material from the feeding chamber through the discharge passage; said level maintaining means including a weight-control slide located between the feeding chamber and the entrance throat; and a level-control device at the exit end of the feeding chamber, said level-control device comprising a wall with flights hingedly mounted in the casing and adapted to be swung down for cleaning purposes.

8. An automatic feeder comprising a casing having an entrance throat, a feeding chamber and a discharge passage; means within the chamber for maintaining a definite level of material therein; means for directing an air current through the feeding chamber over the material therein thereby to convey material from the feeding chamber through the discharge passage; said level maintaining means including a weight-control slide located between the feeding chamber and the entrance throat; a level-control device at the exit end of the feeding chamber, said level-control device comprising a wall with flights hingedly mounted in the casing and adapted to be swung down for cleaning purposes; and a foreign-matter collection pocket into which foreign matter gravitates from said level-control device.

9. In an automatic feeder, a casing having an entrance throat at the top, a feeding chamber in to which said throat discharges, said chamber having a ramp; a level-control device at the discharge end of said chamber; said chamber also enclosing a downward passage connecting with the discharge end of said feeding chamber and said casing having an outlet passage leading from said downward passage, a foreign matter collection pocket at the bottom of said downward passage; a feed control means adjacent the discharge end of the feeding chamber; a weight-control means in the casing between said feed control means and said entrance throat; and screen bars mounted in said casing and extending from adjacent said weight-control means backwardly and upwardly into said entrance throat.

10. In an automatic feeder, a casing having an entrance throat at the top, a feeding chamber into which said throat discharges, said chamber having a ramp; a level-control device at the discharge end of said chamber; said chamber also enclosing a downward passage connecting with the discharge end of said feeding chamber and said casing having an outlet passage leading from said downward passage; a foreign matter collection pocket at the bottom of said downward passage; a feed control means adjacent the discharge end of the feeding chamber; a weight-control means in the casing between said feed control means and said entrance throat; and screening means through which the material passes from said throat to said feeding chamber.

11. In an automatic feeder, a casing comprising side walls, a back wall, a front wall and a bottom, said casing including an entrance throat having a movable front wall constituting a cleanout door; a cutoff valve in the top of said throat; a hopper discharging into said throat; a horizontal partition in said casing adjacent the bottom and spaced therefrom to constitute an outlet passage, said back wall having an opening for said passage; a level-control device at the front end of said horizontal partition and extending above the same, a ramp extending upwardly and rearwardly from said horizontal partition; said casing enclosing a feeding chamber whose bottom is constituted by a portion of said horizontal partition and said ramp, and said casing enclosing a downward passage in front of said feeding chamber and the entrance to said outlet passage and effecting communication between the two; a cover for said downward passage; a throat at the bottom of said downward passage; a feed control device at the juncture of said feeding chamber with said downward passage; and a weight control device located between said entrance throat and said feed control device for the purposes specified.

12. In an automatic feeder, a casing comprising side walls, a back wall, a front wall and a bottom, said casing including an entrance throat having a movable front wall constituting a cleanout door; a cutoff valve in the top of said throat; a hopper discharging into said throat; a horizontal partition in said casing adjacent the bottom and spaced therefrom to constitute an outlet passage, said back wall having an opening for said passage; a level-control device at the front end of said horizontal partition and extending above the same, a ramp extending upwardly and rearwardly from said horizontal partition; said casing enclosing a feeding chamber whose bottom is constituted by a portion of said horizontal partition and said ramp; and said casing enclosing a downward passage in front of said feeding chamber and the entrance to said outlet passage and effecting communication between the two; a cover for said downward passage; a throat at the bottom of said downward passage; a feed control device at the juncture of said feeding chamber with said downward passage; a weight control device located between said entrance throat and said feed control device; said level-control device having flights for the purposes specified.

13. In an automatic feeder, a casing having a feeding chamber; means to introduce materials into said casing continuously; means for delivering materials to said chamber continuously as material is removed therefrom; suction means to remove said material and including means to direct a current of air over the surface of the material, said casing having an outlet through which the material is removed; and means to maintain a constant level of material in said feeding chamber, said last named means including a level-defining device and means to prevent overflow of material to said level-defining device.

14. In an automatic feeder, a casing having a feeding chamber; means to introduce materials into said casing continuously; means for delivering materials to said chamber continuously in proportion to the amount of material removed therefrom to maintain a definite level of material in said feeding chamber, said means including a level-defining device, and a device for preventing the overflow of material to said defining device, suction means to remove said material, said casing having an outlet through which the material is removed; and means within the feeding chamber to vary the velocity and action of said pneumatic means on the material in said feeding chamber.

15. In an automatic feeder, a casing having a feeding chamber; means to introduce materials into said casing continuously; means for delivering materials to said chamber continuously in proportion to the amount of material removed therefrom to maintain a definite level of material in said feeding chamber, said means including a level-defining device, and a device for preventing the overflow of material to said defining device; suction means to remove said material, said casing having an outlet through which the material is removed; and means to trap foreign matter in said feeding chamber.

16. In an automatic feeder, a casing having a feeding chamber; means to introduce materials into said casing continuously; means for delivering materials to said chamber continuously in proportion to the amount of material removed therefrom to maintain a definite level of material in said feeding chamber, said means including a level-defining device, and a device for preventing the overflow of material to said defining device; suction means to remove said material, said casing having an outlet through which the material is removed; means to trap foreign matter in said feeding chamber; said casing having a collection pocket into which excess foreign matter passing from said trap may fall.

17. In an automatic feeder for mills having suction fans; an elongated casing having an entrance adjacent one end for grain, means for delivering grain through said entrance to said casing, a floor within said casing onto which the grain is deposited, said floor extending from adjacent the end of the casing having the entrance toward the other end of the casing, a grain level-defining dam located on said floor adjacent the extended end of said floor and spaced from the top of the casing to provide an air passage over the dam, a grain feed control device within the casing located between said dam and said entrance opening, said casing having an air inlet above the floor and between said feed control device and said entrance opening, and a suction duct for connection to the suction side of the mill's fan and leading from said casing adjacent the end where said dam is located for the purposes described.

18. In an automatic feeder for mills having suction fans; an elongated casing having an entrance adjacent one end for grain, means for delivering grain through said entrance to said casing, a floor within said casing onto which the grain is deposited, said floor extending from adjacent the end of the casing having the entrance toward the other end of the casing, a grain level-defining dam located on said floor adjacent the extended end of said floor and spaced from the top of the casing to provide an air passage over the dam, a grain feed control device within the casing located between said dam and said entrance opening, said casing having an air inlet above the floor and between said feed control device and said entrance opening, a suction duct for connection to the suction side of the mill's fan and leading from said casing adjacent the end where said dam is located, and a second grain control device adjacent said entrance opening for controlling the flow-of-grain-by-gravity along said floor toward said feed control device and preventing overflow of grain to said dam.

19. In an automatic feeder for mills having suction fans; an elongated casing having an entrance adjacent one end for grain, means for delivering grain through said entrance to said casing, a floor within said casing onto which the grain is deposited, said floor extending from adjacent the end of the casing having the entrance toward the other end of the casing, a dam located on said floor adjacent the extended end of said floor and spaced from the top of the casing to provide an air passage over the dam, a grain feed control device within the casing located between said dam and said entrance opening, said casing having an air inlet above the floor and between said feed control device and said entrance opening, and a suction duct for connection to the suction side of the mill's fan and leading from said casing adjacent the end where said dam is located, said feed control device comprising a slide-valve holder pivotally mounted above the floor and including a slide adjustable toward and from the floor.

20. In an automatic feeder for mills having suction fans; an elongated casing having an entrance adjacent one end for grain, means for delivering grain through said entrance to said casing, a floor within said casing onto which the grain is deposited, said floor extending from adjacent the end of the casing having the entrance toward the other end of the casing, a dam located on said floor adjacent the extended end of said floor and spaced from the top of the casing to provide an air passage over the dam, a grain feed control device within the casing located between said dam and said entrance opening, said casing having an air inlet above the floor and between said feed control device and said entrance opening, a suction duct for connection to the suction side of the mill's fan and leading from said casing adjacent the end where said dam is located, and a second grain control device adjacent said entrance opening for controlling the flow-of-grain-by-gravity along said floor toward said feed control device and said dam, said feed control device comprising a slide-valve holder pivotally mounted above the floor and including a slide adjustable toward and from the floor.

21. In an automatic feeder for mills having suction fans; an elongated casing having an entrance adjacent one end for grain, means for delivering grain through said entrance to said casing, a floor within said casing onto which the grain is deposited, said floor extending from adjacent the end of the casing having the entrance toward the other end of the casing, a dam located on said floor adjacent the extended end of said floor and spaced from the top of the casing to provide an air passage over the dam, a grain feed control device within the casing located between said dam and said entrance opening, said casing having an air inlet above the floor and between said feed control device and said entrance opening, a suction duct for connection to the suction side of the mill's fan and leading from said casing adjacent the end where said dam is located, and means located in the casing beyond and adjacent to said dam and adjacent the entrance to said suction duct for trapping foreign matter sucked over the dam.

22. In an automatic feeder for mills having suction fans; an elongated casing having an entrance adjacent one end for grain, means for delivering grain through said entrance to said casing, a floor within said casing onto which the grain is deposited, said floor extending from adjacent the end of the casing having the entrance toward the other end of the casing, a dam located on said floor adjacent the extended end of said floor and spaced from the top of the casing to provide an air passage over the dam, a grain feed control device within the casing located between said dam and said entrance opening, said casing having an air inlet above the floor and between said feed control device and said entrance opening, a suction duct for connection to the suction side of the mill's fan and leading from said casing adjacent the end where said dam is located, said feed control device comprising a slide-valve holder pivotally mounted above the floor and including a slide adjustable toward and from the floor, and means located in the casing beyond and adjacent to said dam and adjacent the entrance of said suction duct for trapping foreign matter sucked over the dam.

23. In an automatic feeder, a casing having an entrance throat at the top, a feeding chamber into which said throat discharges, said chamber having a ramp and a floor; a level-defining device located at the discharge end of said chamber; said chamber also enclosing a downward passage connecting with the discharge end of said feeding chamber, and said casing having an outlet passage leading from said downward passage; a foreign matter collection pocket at the bottom of said downward passage, means for directing air current through said feeding chamber over the material therein thereby to convey the material from the feeding chamber through said downward and outlet passages, said last named means including an adjustable air control gate adjacent the discharge end of the feeding chamber; and means in the casing adjacent the entrance throat for preventing overflow of material to said level-defining device.

24. A pneumatic feeder for grain mills comprising a box having a horizontal floor, means to deliver grain onto said floor and cause it to flow along said floor under the influence of gravity, a dam at one place on said floor to arrest the flow of grain under the action of gravity and define a definite level for the grain on the floor, means to prevent overflow of grain moved under the action of gravity to said dam, and a suction duct having an air entrance over the grain on the floor located between said dam and said delivery means for lifting grain over the dam and conveying it to the mill and means in said suction duct and located over the grain for varying the action of the lifting air current over the grain.

25. A pneumatic feeder for grain mills comprising a box having a horizontal floor, means to deliver grain onto said floor and cause it to flow along said floor under the influence of gravity, a dam at one place on said floor to arrest the flow of grain under the action of gravity and define a definite level for the grain on the floor, means to prevent overflow of grain moved under the action of gravity to said dam, and a suction duct having an air entrance over the grain on the floor located between said dam and said delivery means for lifting grain over the dam and conveying it to the mill, and means to adjust the relation of said air entrance to the level of the grain on the floor for the purpose described.

26. In automatic feeders for mills which have suction fans; a casing enclosing a feeding chamber, a means to feed grain into said chamber by gravity, a grain level-defining means within said chamber, means to prevent overflow of grain by gravity to said defining means, and means cooperating with the suction fan of the mill to direct a current of air over the surface of the grain in said chamber and create an air syphon over the grain within said feeding chamber for withdrawing the grain from said casing.

27. In an automatic feeder for mills which have suction fans; a casing enclosing a feeding chamber, means to deliver grain by gravity into said feeding chamber, a floor within said feeding chamber for receiving the grain from said delivery means, a dam on said floor against which the grain may flow by gravity from said receiving means and which defines the level of the grain on the floor, means for preventing overflow of grain by gravity to said dam, and means cooperating with the suction fan of the mill for directing a current of air over the surface of the grain in said chamber and for creating an air syphon for drawing grain over the dam and delivering it to the mill from the casing.

WILLIAM ALEXANDER SEYMOUR.